United States Patent
Iffland et al.

(10) Patent No.: US 7,041,952 B2
(45) Date of Patent: May 9, 2006

(54) METHOD FOR AUTOMATIC FOCUSING AN IMAGING OPTICAL SYSTEM ON THE SURFACE OF A SAMPLE

(75) Inventors: Thomas Iffland, Jena (DE); Gert Weniger, Jena (DE); Joachim Wienecke, Jena (DE)

(73) Assignee: Leica Microsystems Jena GmbH, Jena (DE)

( * ) Notice: Subject to any disclaimer, the term of this patent is extended or adjusted under 35 U.S.C. 154(b) by 169 days.

(21) Appl. No.: 10/777,137

(22) Filed: Feb. 13, 2004

(65) Prior Publication Data

US 2004/0169124 A1    Sep. 2, 2004

(30) Foreign Application Priority Data

Feb. 27, 2003    (DE) .................. 103 08 171

(51) Int. Cl.
G02B 27/64 (2006.01)

(52) U.S. Cl. .................................. 250/201.4
(58) Field of Classification Search .. 250/201.2–201.4, 250/201.8

See application file for complete search history.

(56) References Cited

U.S. PATENT DOCUMENTS

| | | | |
|---|---|---|---|
| 4,798,948 A * | 1/1989 | Neumann et al. | 250/201.3 |
| 5,483,079 A | 1/1996 | Yonezawa | |
| 5,604,344 A | 2/1997 | Finarov | |
| 5,747,813 A | 5/1998 | Norton et al. | |

* cited by examiner

Primary Examiner—Thanh X. Luu
(74) Attorney, Agent, or Firm—Foley & Lardner LLP

(57) ABSTRACT

A sample P is illuminated by a measurement light beam with an incidence angle differing from 0°; light reflected therefrom is detected; intensity values are recorded and evaluated; and the opening of a field stop is imaged onto a receiving surface, thereby generating an image. In such a method, a value of "light" or "dark" is allocated to each intensity value as a function of a brightness threshold; the smallest rectangle that encloses all "light" positions on the receiving surface is determined; the geometric center point of that rectangle is determined; the position of that point is compared with the position on the receiving surface that corresponds to the geometric center point of the image generated by the field stop in the focused state; and a change in the distance between the sample and the imaging optical system corresponding to the distance between the two points is effected.

4 Claims, 4 Drawing Sheets

METHOD FOR AUTOMATIC FOCUSING AN IMAGING OPTICAL SYSTEM ON THE SURFACE OF A SAMPLE

CROSS REFERENCE TO RELATED APPLICATIONS

This application claims priority of the German patent application 103 08 171.2 which is incorporated by reference herein.

FIELD OF THE INVENTION

The invention concerns a method for automatic focusing onto the surface of a sample, in which the sample is illuminated by a measurement light beam that strikes the surface of the sample at an incidence angle differing from 0°, light reflected from the surface of the sample is detected by means of a position-sensitive receiving surface, intensity values of the reflected light as allocated to positions on the receiving surface are recorded and evaluated, and the opening of a field stop is imaged onto the receiving surface, thereby generating an image that is smaller than the receiving surface; and refers to the problem of a reliable automatic focusing system.

BACKGROUND OF THE INVENTION

A number of methods for automatic focusing are known in the existing art. U.S. Pat. No. 5,483,079, for example, describes a method for focusing onto the surface of a light-transmitting specimen that is based on the pupil splitting principle. In this, the symmetry of the illumination at the focus point is analyzed using a special receiver. The energy center of the illuminated surface on the receiver is defined as the focus point. A method of this kind is very fast, but also has the disadvantage that it reacts sensitively both to inhomogeneities in the reflectance of the sample and to edges, such as those usually present e.g. on patterned wafers. Asymmetries in the illumination of the receiver are caused by the inhomogeneous reflectance or by scattered light produced at such pattern edges. These asymmetries in the light distribution or intensity distribution are interpreted by the focus measurement system as deviations from the ideal image plane, since the energy center point has a different location than in the case of homogeneous illumination. An attempt is made to compensate for these supposed deviations by displacing the image plane. This results in defocusing.

A further disadvantage of such focusing methods based on pupil splitting results from the manner in which they are usually implemented, namely as an optical system in addition to the main beam path: the light necessary for focusing is switched into the main beam path via a mirror, and also switched out again via another mirror. In other words, further components must also be made available in addition to the actual optical system in which the components arranged along the main beam path serve, for example, to analyze layer thicknesses. The light source used for the system that provides focusing is moreover usually a laser that operates in a narrow wavelength region in the infrared. This causes substantial decreases in reflectance with layer combinations of certain materials, so that focusing is no longer possible at all.

Other, so-called "intelligent" focusing methods use the image content itself as a criterion for focusing. In such methods, the image of the sample is generally imaged onto a CCD receiver and examined in terms of various sharpness criteria. This method, too, has a number of disadvantages. For one, the image must exhibit a structure so that the sharpness can be analyzed in the first place. Such is not the case for all samples, however. On the other hand, the capture region is very small and, as a result, the optimum focus point is difficult to find. The reason for this may be found in the manner in which the method is carried out: when a measurement location on the sample is traveled to with a measuring instrument, the deviation from the focus point is usually so great that all the structures in the image field are extremely unsharp, and no criteria for sharpness can be derived from them. The direction in which the image plane must be displaced to make the image sharper is, moreover, initially unknown. These problems are solved by acquiring a series of images in a sequence of image planes while traversing a large focus region, and then assuming that the image plane of the image having the greatest sharpness is the focal plane, i.e. the image plane containing the focus point. This does not, however, necessarily find the focus point, whose image plane need not inevitably be contained in the previous acquired sequence. A method of this kind is thus unsuitable when it becomes necessary to perform measurements on a focused specimen, for example using spectrophotometers in layer thickness determination.

An automatic focusing system that likewise utilizes image processing but is said also to be suitable for unstructured surfaces is presented in U.S. Pat. No. 5,604,344. In the method described therein, a special structure is imaged onto the surface of the measured specimen and then analyzed in terms of its sharpness. With this method, problems once again crop up when interactions occur between the imaged structures on the one hand and structures in the measured specimen on the other hand.

The problem of determining the direction in which focusing is to occur is solved in a variant embodiment of U.S. Pat. No. 5,604,344 by the fact that several structures located in different image planes are used. The disadvantage of the small capture region (and thus relatively long focusing times) nevertheless remains, however, since a large region must be repeatedly searched.

U.S. Pat. No. 5,747,813 describes another method that uses an asymmetrical measurement beam path, i.e. a beam path in which the incidence angle of the light onto the sample surface differs from 0°, for examination of the sample. As a consequence, the location of the image field on a position-sensitive detector (for example, a video camera) shifts along a straight line when the distance between the imaging optical system and the sample is adjusted. With a homogeneously illuminated image field, focusing is said to be achieved when the image field is located centeredly on the receiver; the recorded intensity is used for fine adjustment, and the focus point corresponds to a minimum of the recorded intensity. Inhomogeneities in the reflectance of the sample such as those brought about e.g. by structures can, however, easily cause distortion of this analysis so that focusing is unsuccessful.

SUMMARY OF THE INVENTION

Proceeding from this existing art, it is therefore the object of the invention further to develop a method of the kind cited initially in such a way that focusing reliability is improved and also, in particular, so that reliable automatic focusing onto samples of inhomogeneous reflectance can be achieved.

According to the present invention, the object is achieved in a method of the kind described above in that a value of "light" or "dark" is allocated to each intensity value depending on whether it exceeds or falls below a brightness threshold, the smallest rectangle that encloses all positions on the receiving surface whose intensity value is "light" is determined, the geometric center point of that rectangle is determined, the position of the geometric center point is compared with the position on the receiving surface that corresponds to the geometric center point of the image generated by the field stop in the focused state, and a change in the distance between the sample and the imaging optical system corresponding to the distance between the two points is effected.

The field stop, whose opening is imaged and whose image on the receiving surface thus determines the image field, need not be permanently located in the beam path of the measurement light beam but instead can be pivoted in and then out again after focusing is complete. The field stop opening can have almost any geometric shape. The field stop opening must furthermore be selected so that the image that is generated on the receiving surface—i.e. the image of the field stop produced on the receiving surface—is smaller than the receiving surface itself.

The light is incident onto the sample asymmetrically, i.e. at an angle differing from 0°, and the image field and its center point therefore shift on the receiving surface along a straight line when the distance between sample and imaging optical system (i.e. the height of the sample) is adjusted. Each location of the image on the receiving surface therefore also corresponds to an analogous distance between sample and imaging optical system.

In order to determine the location of the image of the field stop on the receiving surface, firstly each recorded intensity value has allocated to it, as a function of a predefined brightness threshold, a value of "light" if it lies above the brightness threshold or "dark" if it lies below the brightness threshold.

In the next step, the smallest rectangle that encloses all positions on the receiving surface whose intensity value is "light" is determined.

In the next step, the geometric center point of the rectangle thus identified is determined, and the position of that point is compared with the position on the receiving surface that corresponds to the geometric center point of the image of the field stop in the focused state. As already mentioned above, each location of the image of the field stop, and thus also the position of its geometric center point, corresponds to a distance between sample and imaging optical system. The geometric center point of the image field is displaced along a straight line. If a Cartesian coordinate system having X and Y coordinates is then defined on the receiving surface, and if an equation of the form y=mx+n (where m is the slope and n the intercept) is used for the straight line, a determination of the difference between the coordinates of the two points, in either the X or Y direction, is then sufficient to determine the necessary change in the distance between sample and imaging optical system; that distance change can then be effected. It is in fact sufficient to determine the difference with reference to only one coordinate (either X or Y); the other coordinate can also be included for checking purposes. The imaging optical system may also be designed in such a way that the straight line extends parallel to the X or the Y direction. In this case only one of the two coordinates is available, and a straight-line equation also cannot be determined. A unique correlation nevertheless exists between the position on the straight line of the geometric center point of the rectangle, and the distance to the focus point. In each case, a system calibration is first carried out as a function of the optical system being used (since the magnification of the objective, for example, plays an essential role), in which the parameters m and n of the straight-line equation are determined, if applicable. This is done by analyzing a test sample that is unstructured and highly uniform in terms of reflectance. The focused state of the sample is programmed to this, i.e. the reference values for the positions of the geometric center, and the side ratios of the image of the field stop at those positions, are determined. To determine the straight line, or the dependence of the position of the geometric center on the distance of the imaging optical system, a deliberate defocusing operation is performed and the geometric center point of the image of the field stop is determined as a function of the distance between sample and imaging optical system.

Finally, in the last step a change in the distance between the sample and the imaging optical system corresponding to the distance between the two points is effected. Because of the reciprocally unique correlation between the location of the image of the field stop in the image field and the distance of the sample from the imaging optical system (also referred to as the sample's Z position), it is possible in principle to focus onto the sample in one step. With an objective having 15× magnification and an aperture of 0.28, the capture region extends up to +/−200 μm around the focus point; with conventional arrangements this is usually approximately +/−5 μm. If it proves impossible to identify the geometric center point due to severe defocusing—reasons for which might include structural elements with a low reflectivity, or reaching the edge of the image field—the focusing step does not result in complete focusing of the sample but does yield at least an approximation to the focused state, so that a repetition of the procedure can focus the sample. Since, moreover, the geometric center and not the energy center is used for analysis, the method is also very robust in terms of inhomogeneities in reflectance.

When the method is carried out, it may in some circumstances happen that the image of the field stop on the receiving surface has been clipped, for example as a result of particularly irregular structures. In this case the geometric center point of the rectangle identified upon analysis will not lie on the previously determined straight line. In an advantageous embodiment of the method, an analysis is therefore made as to whether the geometric center point of the rectangle lies on a predefined straight line. If this is not the case, the clipping of the image of the diaphragm also causes the side ratios of the rectangle to deviate from those that were determined during calibration. The side ratios are then modified and adapted to the predefined side ratios in such a way that the geometric center point is thereby displaced onto the predefined straight line. Only then is the change in distance effected, on the basis of the corrected geometric center point. An analysis of the side ratios of the rectangle is of course also equivalent, for the aforementioned purpose, to an analysis as to whether the geometric center point lies on the predefined straight line.

Only in extremely unfavorable circumstances, which as a rule occur very seldom, can it also happen that while a rectangle having the correct side ratios is identified, its geometric center point nevertheless does not lie on the straight line that determines the displacement of the image field. This can be the case with a square diaphragm, for example, if two adjacent side lengths of the square are shortened to the same extent in the image. These discrepancies are usually very small, however, and can be ignored. The change in distance in this case will not result in exact focusing, but will arrive in the region of the focus point so that successful focusing can occur in a second step.

In a further advantageous embodiment of the invention, adjustment can be improved here by additionally determining the sharpness of the edges of the image field based on the recorded intensities and the locations of the edges of the geometric figure, and determining, based on a comparison of the sharpness with a predefined sharpness criterion, the vertical displacement needed to establish maximum sharpness of the image field. That vertical displacement is used for fine adjustment.

The sharpness criterion that is used can be, for example, a comparison of the intensities of two predefined points on the receiving surface, of which (in the focused state) the one point lies within the image and the other outside the image. The image is sharpest with a maximum intensity difference; the smaller the difference, the more blurry the image. Here again, a dependence of the sharpness criterion on the Z position of the sample can be determined on a test sample, and used to calibrate the vertical displacement; at the same time, a standardization in terms of maximum brightness can also be performed for each of the samples to be examined. Since the sharpness criterion exhibits a symmetrical behavior with respect to the focus point, however, it cannot be employed for directional determination, i.e. the sharpness analysis is usable for focusing only in combination with the other steps.

In a further advantageous embodiment that is also used for fine adjustment, the sharpness within the image field is determined on the basis of the recorded intensity values; based on a comparison of the sharpness with a predefined sharpness criterion, the vertical displacement necessary to establish maximum sharpness of the image field is determined; and that vertical displacement is used for fine adjustment.

BRIEF DESCRIPTION OF THE DRAWINGS

The invention will be explained below with reference to an exemplary embodiment. In the drawings relevant thereto.

DETAILED DESCRIPTION OF THE INVENTION

Figure 1:
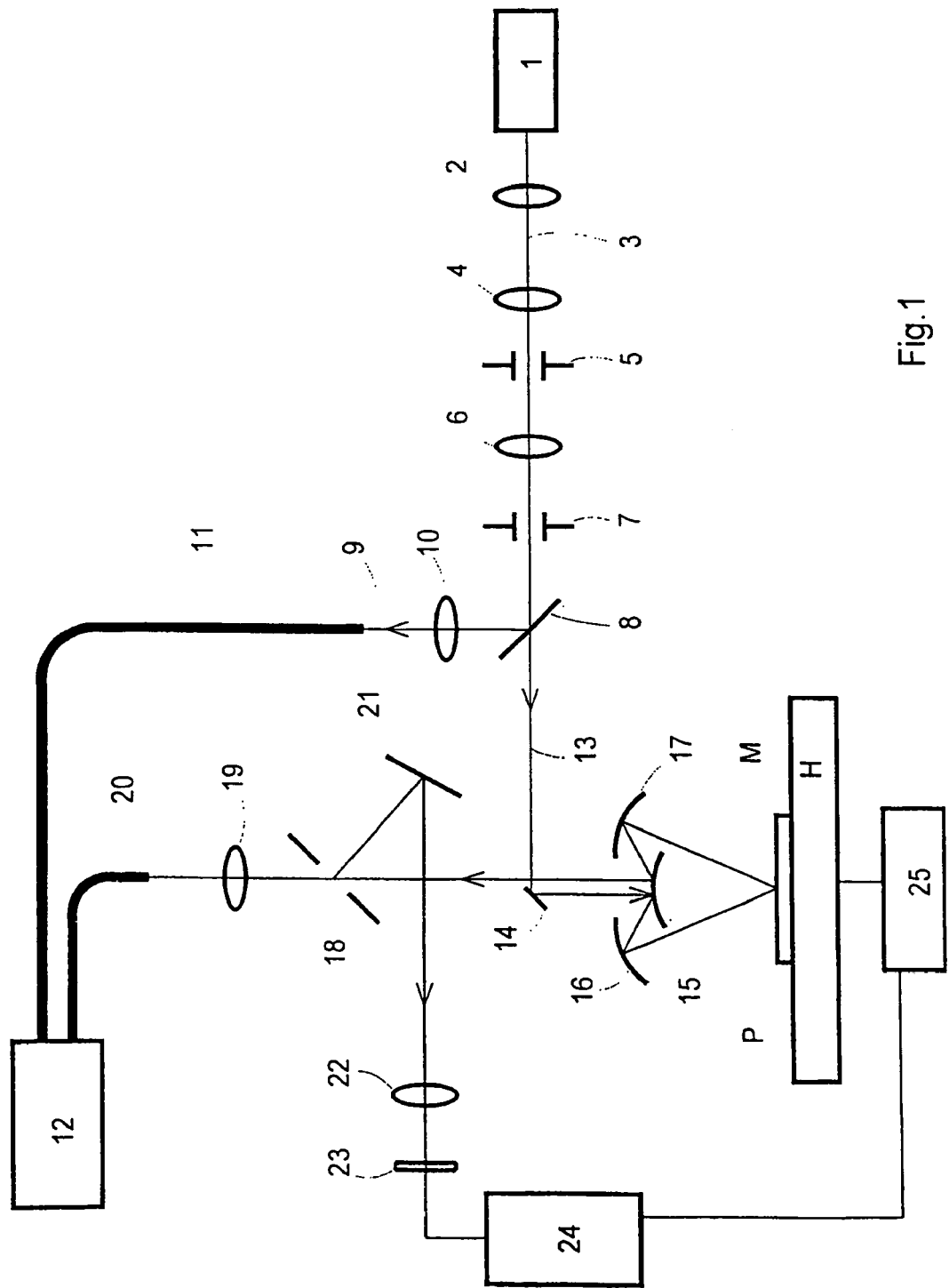
FIG. 1 shows an arrangement with which the method according to the present invention can be carried out.

FIG. 1 firstly shows an arrangement with which the method can be carried out. A light source 1 generates light in a large wavelength region. The light is collimated into a light beam 3 by a lens arrangement 2. Light beam 3 passes through a further lens arrangement 4, an aperture stop 5, a further lens arrangement 6, and a field stop 7 and then strikes a beam splitter 8. At beam splitter 8, the measurement light beam is divided. One portion is directed, as reference light beam 9, through a lens arrangement 10 to a light-guiding device 11 that conveys the light signal to a measurement analysis device 12. The other portion, as measurement light beam 13, is imaged via mirrors 14, 15, and 16 onto measurement point M on sample P, which is located in a mount H. Measurement light beam 13 reflected there, after reflection at a mirror 17 and mirror 18 and passage through a pinhole mirror 18 and a collecting lens 19, reaches the entrance of a light-guiding device 20 that conveys it to measurement analysis device 12.

Pinhole mirror 18 is of semitransparent configuration. The sub-beam necessary for automatic focusing is reflected there and imaged, via a deflection mirror 21 and a lens group 22, onto a position-sensitive receiving surface 23 embodied here, by way of example, as the receiving matrix of a CCD unit.

The latter is connected to an evaluation unit 24 that in turn is connected to a control system for vertical displacement 25 of mount H. Vertical displacement of mount H is equivalent to a change in the distance between sample P and the imaging optical system.

Figure 2:
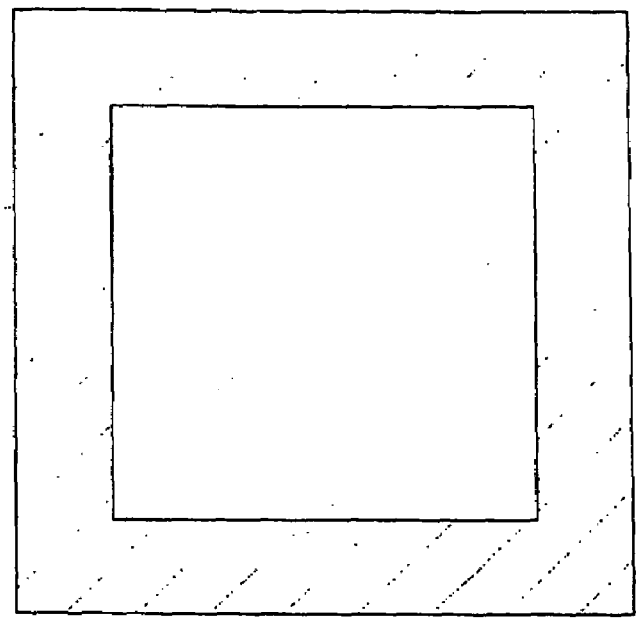
FIG. 2 shows one possible configuration of a field stop.

In automatic focusing, field stop 7 is imaged by means of measurement light beam 13 onto sample P. A simple example of a field stop 7 is shown in FIG. 2, where field stop 7 has a square cutout for the passage of light; the image generated by it in the focused state will likewise, correspondingly, be square. The shape of field stop 7 is not essential, however, and can assume any possible geometric configuration, since ultimately a rectangle 26 is always analyzed in the evaluation process. Moreover, the image of field stop 7 in the defocused state is always visible as a bright spot, as is evident e.g. from FIG. 3.

The image field defined by field stop 7 is then imaged onto the receiving matrix of the CCD unit. Field stop 7 must be designed so that when it is imaged on the receiving matrix of the CCD unit, an image that is smaller than or equal in size to the area of the receiving matrix is generated, since otherwise the dependence of the geometric center point on the Z position of the sample in the region of the focused state cannot be utilized. In principle, however, the method also functions even when the image generated is exactly the same size as the receiving surface. From the CCD unit, the received data (i.e. the intensity values as allocated to positions on the receiving matrix) are conveyed to evaluation unit 24. In evaluation unit 24 a so-called "blob analysis" of the acquired image is then performed, in which each pixel has assigned to it the value "light" or "dark" depending on whether the intensity recorded from it lies above or below a predefined brightness threshold. If the intensities are evaluated, for example, on a scale from 0 (black) to 255 (white) and if the brightest recorded intensity lies between 80 and 160, a brightness threshold of 32 then, for example, usually yields a result that can be used for further evaluation. The maximum intensity can be modified by modifying the exposure time for the receiving surface.

The next step looks for the smallest rectangle 26 that encloses all positions on the receiving matrix of the CCD unit whose intensity value is "light."

In may be useful in this context, before determining rectangle 26, to apply to the intensity values a smoothing function in which the brightness of each pixel is determined in consideration of the brightnesses of the adjacent pixels. This can prevent a high-intensity value brought about e.g. by a defect in the imaging optical system, which is surrounded only by dark points and lies far outside the image actually generated by the field stop, from being taken into consideration in the analysis and resulting in an incorrect rectangle 26 that is much too large.

Figure 3:
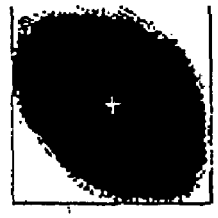
FIG. 3 shows the image of a square field stop in the defocused state, and the rectangle that is identified.

The geometric center point of the figure constructed in this fashion is then determined. This is depicted in FIG. 3.

In the defocused state, field stop 7 is imaged as a bright spot that no longer resembles the original shape of field stop 7. The brightness distribution in FIG. 3 is shown inverted; in other words, as with exposed film, high intensities correspond to dark areas and low intensities to light areas. The cross at the center of rectangle 26 marks the identified geometric center point.

The latter's location is then compared with the position on receiving surface 23 that corresponds to the geometric center point of the image generated by field stop 7 in the focused state and lies on a calibration line previously stored in evaluation unit 24. The calibration line is identified by deliberate defocusing using the same field stop 7 in a known system, and can be used for all subsequent measurements with that field stop 7.

Figure 4:
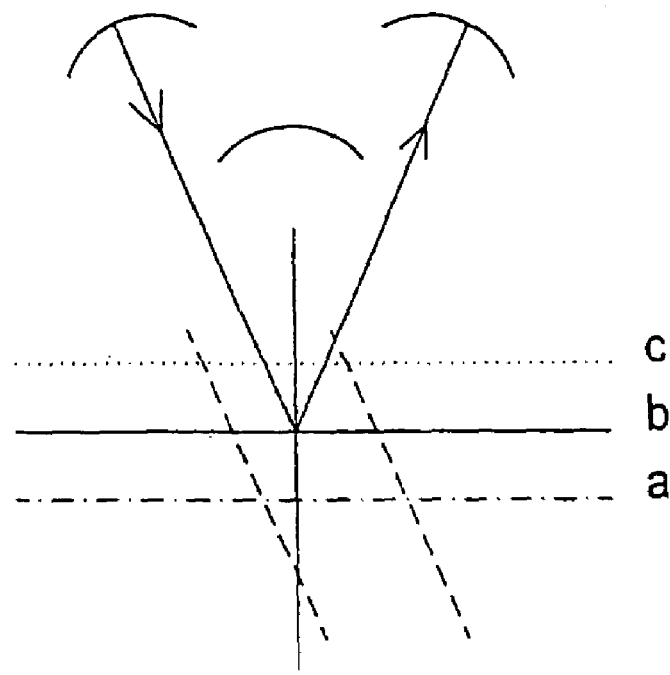
FIG. 4 shows three different vertical adjustments for the image plane.
Figure 5:
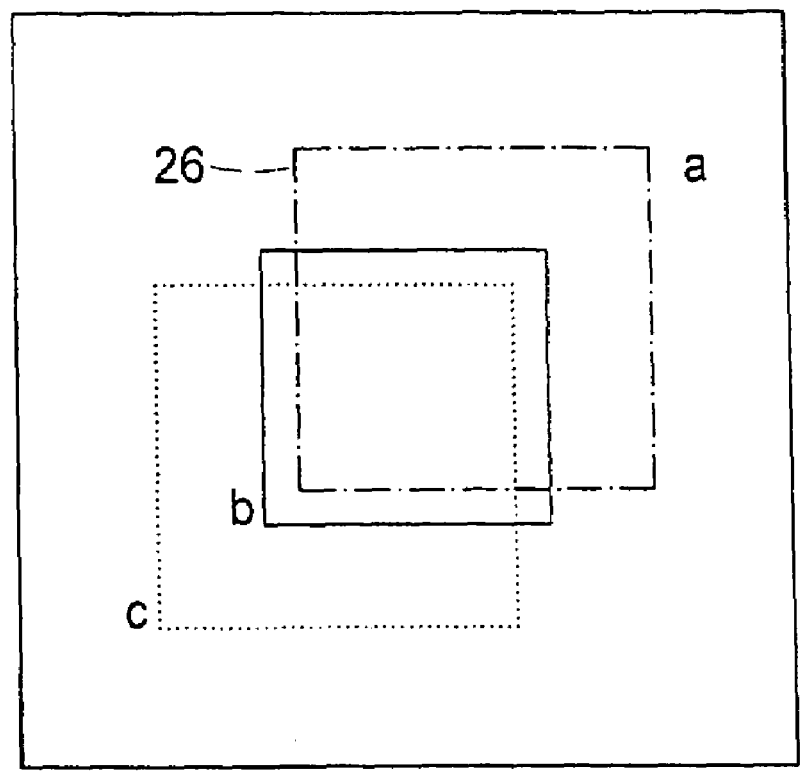
FIG. 5 shows the images of the image field on the receiving matrix of the CCD unit resulting from the three different vertical adjustments.

Each position on the calibration line corresponds to a different vertical adjustment and to a different image plane. This is illustrated in FIGS. 4 and 5. FIG. 4 depicts measurement positions in three different image planes a, b, and c. Height a corresponds to an extrafocal location of sample P, and height c to an intrafocal sample position. At height b, sample P is exactly in focus. FIG. 5 depicts the corresponding images of a field stop 7, as shown in FIG. 2, on the position-sensitive receiving surface. As the height is varied, the geometric center point of the images, and rectangles 26 or squares enclosing them, shift along a straight line; in general, as the deviation of the image and focus planes from one another becomes greater, the image also becomes more indistinct and less similar to a square. The size also changes: rectangle 26 that encloses the image of the field stop becomes larger as defocusing increases.

Figure 6:
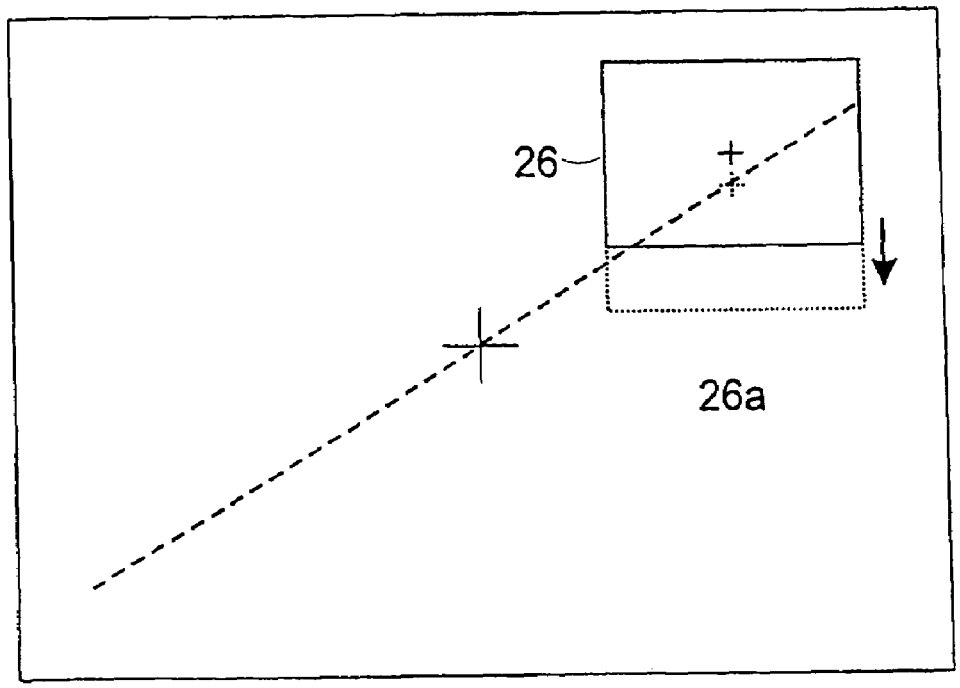
FIG. 6 shows modification of a rectangle in order to shift its geometric center point onto a predefined straight line.

If the geometric center point of rectangle 26 is not located on the calibration line, a correction calculation must first be performed in order to modify rectangle 26 and its location so that its geometric center point lies on the calibration line. This is depicted by way of example in FIG. 6. The predefined line is depicted as a dashed diagonal, and the focus point as a large cross. The geometric center point of the initially identified rectangle 26, depicted by the small, solid-line cross as the center point of solid-line rectangle 26, is in this case located above the predefined straight line. An examination of the side ratio shows that the vertical sides have been shortened compared with the horizontal ones. In this case the geometric center point is shifted vertically downward, and the side lengths are extended vertically downward by an amount equal to twice the vertical distance of the geometric center point from the straight line. This is indicated by the downward-pointing arrow in the Figure. The resulting rectangle 26a is shown with dotted lines, and its geometric center point (marked by a dotted-line cross) now lies on the straight line.

Lastly, based on the distance on the calibration line between the geometric center point of the figure and the geometric center point of the image field in the focused state, a determination is made in evaluation unit 24 of the vertical displacement needed in order to bring the two points into coincidence, i.e. to bring sample P into accurate focus. The necessary vertical displacement is then transmitted to control system for vertical displacement 25, which automatically effects the corresponding vertical shift of mount H. If the focusing operation performed in this step turns out not be sufficiently accurate, a fine adjustment can be made in a further refining step in which the sharpness of the edge of the image of field stop 7 is analyzed.

What is claimed is:

1. A method for automatic focusing an imaging optical system on the surface of a sample, comprising the steps of:
    illuminating the sample by a measurement light beam that strikes the surface of the sample at an incidence angle differing from 0°;
    detecting light reflected from the surface of the sample by a position-sensitive receiving surface;
    allocating intensity values of the reflected light as to positions on the receiving surface;
    imaging the opening of a field stop onto the receiving surface, thereby generating an image that is smaller than the receiving surface;
    allocating a value of "light" or "dark" to each intensity value depending on whether each intensity value exceeds or falls below a defined brightness threshold;
    determining a smallest rectangle that encloses all positions on the receiving surface whose intensity value is "light";
    determining a geometric center point of said rectangle;
    comparing a position of the geometric center point with a position on the receiving surface that corresponds to the geometric center point of the image generated by the field stop in the focused state; and
    effecting a change in the distance between the sample and the imaging optical system corresponding to the distance between the two points.

2. The method as defined in claim 1, wherein the geometric center point of the rectangle is examined as to whether it lies on a predefined straight line, and if such is not the case, the side ratios of the rectangle are modified so that the geometric center point of the rectangle is shifted onto the straight line.

3. The method as defined in claim 1, wherein the imaged opening of the field stop has at least one edge formed on the receiving surface; the method further comprising:
    determining the sharpness of the at least one edge of the image of the field stop, additionally based on recorded intensities and locations of the edges of the geometric figure of the field stop;
    determining a vertical displacement needed to establish maximum sharpness of the image field stop, wherein the needed vertical displacement is based on a comparison of the sharpness with a predefined sharpness criterion; and
    using said vertical displacement for fine adjustment.

4. The method as defined in claim 1, wherein the imaged opening of the field stop has at least one edge formed on the receiving surface; the method further comprising:
    determining the sharpness of the at least one edge of the image of the field stop on the basis of recorded intensity values;
    determining a vertical displacement needed to establish maximum sharpness of the image field stop, wherein the needed vertical displacement is based on a comparison of the sharpness with a predefined sharpness criterion; and
    using said vertical displacement for fine adjustment.

* * * * *